United States Patent [19]

Kulakowski et al.

[11] Patent Number: 5,394,534
[45] Date of Patent: Feb. 28, 1995

[54] DATA COMPRESSION/DECOMPRESSION AND STORAGE OF COMPRESSED AND UNCOMPRESSED DATA ON A SAME REMOVABLE DATA STORAGE MEDIUM

[75] Inventors: John E. Kulakowski; Rodney J. Means, both of Tucson, Ariz.

[73] Assignee: International Business Machines Corporation, Armonk, N.Y.

[21] Appl. No.: 943,613

[22] Filed: Sep. 11, 1992

[51] Int. Cl.$^6$ ............................................ G06F 12/02
[52] U.S. Cl. ................................................. 395/425
[58] Field of Search ........................................ 395/425

[56] References Cited

U.S. PATENT DOCUMENTS

| | | | |
|---|---|---|---|
| 3,668,647 | 6/1972 | Evangelisti et al. | 395/600 |
| 4,499,539 | 12/1982 | Vosacek | 395/400 |
| 4,622,585 | 11/1986 | Reitsma | 348/409 |
| 4,914,725 | 4/1990 | Belsen et al. | 318/560 |
| 5,109,226 | 4/1992 | MacLean, Jr. et al. | 341/95 |
| 5,247,646 | 9/1993 | Osterlund et al. | 395/425 |

OTHER PUBLICATIONS

BNA's Patent, Trademark & Copyright Journal (0148-7966/94/$0-$1.00) vol. 48 pp. 165-166, "Foreign Sale of MS-DOS . . . "; Jun. 16, 1994.
PKZIP-Compress Files Into Zip Files, pp. 15-26, Jul. 27, 1989, with file listing from a diskette having software copy of the manual.
Shah et al, Data Compressor Decompressor IC, 1990 IEEE International Symposium On Circuits And Systems, May 1-3, 1990 (New Orleans) pp. 41-43.

*Primary Examiner*—David L. Robertson
*Attorney, Agent, or Firm*—H. F. Somermeyer

[57] ABSTRACT

A data file having a plurality of data blocks is divided into one or more transfer units of data blocks. Before data storage, each transfer unit of data blocks is subjected to its own data compression cycle to create a group of compressed data blocks. The size of the data transfer unit, in bytes, is selected to facilitate addressing and retrieving individual recorded groups of compressed data blocks while providing good channel utilization and compression efficiency. Also the data transfer unit size is selected in part based upon data storage efficiency, i.e. the storage of the compressed data should fill as many addressable data storage areas as possible. Upon recording each group of compressed data bytes, an entry is made into a file directory for enabling addressing the recorded compressed data blocks.

14 Claims, 5 Drawing Sheets

DATA COMPRESSION/DECOMPRESSION AND STORAGE OF COMPRESSED AND UNCOMPRESSED DATA ON A SAME REMOVABLE DATA STORAGE MEDIUM

DOCUMENTS INCORPORATED BY REFERENCE

MacLean et al U.S. Pat. No. 5,109,226 is incorporated by reference for its showing of an in line data compaction and decompaction apparatus associated witha peripheral data storage device.

Gelb et al U.S. Pat. No. 5,018,060 titled "ALLOCATING DATA STORAGE SPACE OF PERIPHERAL DATA STORAGE DEVICES USING IMPLIED ALLOCATION BASED ON USER PARAMETERS".

Belser et al U.S. Pat. No. 4,914,725 titled "TRANSDUCER POSITIONING SERVO MECHANISMS EMPLOYING DIGITAL AND ANALOG CIRCUITS".

FIELD OF THE INVENTION

This invention relates to data storage systems that are capable of storing both compressed and uncompressed data on one removable data storage volume and to data processing systems utilizing such data storage systems. This invention also relates to data storage systems that minimize wasted data storage space on a data storage volume while storing compressed data.

BACKGROUND OF THE INVENTION

Many data storage media, such as data storage optical disks, have a so-called fixed block architecture (FBA) format. Such format is characterized in an optical disk format by so-called hard sectoring the disk's single spiral track into a plurality of sectors. Every one of the sectors have identical data storage capacity, i.e. 512 bytes, 1024 bytes, 4096 bytes, etc. Because of the FBA disks and the variability of data lengths of compressed data with respect to the source uncompressed data, in-line data compression has not been employed with FBA formatted disks. It is desired to efficiently store and enable simple random address accessing a variable amount of compressed data resulting from a compressing data formatted into addressable blocks. Such compressed data are then recorded on a FBA formatted disk. If the sector data does not compress to a fewer bytes, then the data are stored without data compression on the data storage disk.

It is also desired to maintain host processor addressability of the compressed data blocks within each compressed group of data blocks. It is also desired when compressing data for storage on a FBA storage medium to maintain a maximal addressability of all unused data storing sectors even though the number of sectors required to store the compressed data blocks is unknown. A further desire is to provide for random addressing of the compressed data blocks recorded in an FBA formatted storage medium.

The data pattern randomness of most input data streams and the variability in the resulting length of the compressed data output after the application of the various compression algorithms, does not allow for the prediction of the amount of storage space required to contain the compressed data. This situation requires a link between the transmission of the data stream to be compressed and recorded and the results of the compression process to assist the host processor in its storage management process.

The function of updating a data file in this environment can not use any usual data updating process (read, update, write back) because the data pattern as a result of the update may not compress to the same degree as the original data block and therefore updated compressed data most probably will not fit in the original storage space required to store the original data.

In an fixed block architecture (FBA) environment, data are recorded on a data storage medium in fixed sized units of storage called sectors where each recording track on the medium contains a fixed number of such sectors. The addressing convention for optical disk devices consists of a track address on the medium and a sector number of the particular track. On optical media storage devices, each of the sectors consists of two major parts; an Identification field (ID) used by the device controller to locate a particular sector by a physical address and a data field for storing data. The informational content of the ID's on hard sectored optical disks are indelibly recorded, as by a stamping/molding process, on the medium at the time of manufacture. Other data storage formats also are usable to practice the present invention, such as the known count-key-data (CKD) and extended count-key-data (ECKD) formats used on many magnetic disk media.

An FBA device attached to a host via the known Small Computer Standard Interface (SCSI) must provide the capability to resolve a Logical Block Address (LBA) used by SCSI architected direct-access data storage devices to address fixed sized units of storage to a unique physical address (track and sector) on the medium. The SCSI attached FBA device provides to the host a contiguous address space of N (N is a positive integer) storage locations which can be accessed for reading or writing in any sequence. Each LBA directory structure (addresses ranging from 0 to N) is the addressing mechanism used to store and retrieve data blocks in the SCSI-FBA environment (some FBA devices also provide the capability to address the storage space using the physical address).

As can be seen from the preceding paragraphs, the principal problem facing a designer of a storage system using data compression techniques in the SCSI-FBA environment is to provide a mechanism by which fixed size units of data, herein termed data blocks, in an input data stream can be recorded in a variable amount of medium storage space and still maintain addressability to the unoccupied storage space and provide for addressability to the recorded data blocks.

Since many optical disks today are of the removable type, it is further desired to enable the removable data storage medium to be self-describing as to compressed and uncompressed data.

DISCUSSION OF THE PRIOR ART

The Vosacek U.S. Pat. No. 4,499,539 shows first allocating a number of data storage segments of a cache or buffer for storing a maximum number of data bytes that are storable in an addressable track of a direct access storage device (DASD) connected to the cache or buffer. The DASD is a magnetic disk storage device. The protocol is to stage or transfer one track of DASD data to the cache or buffer in one input-output operation (one access to the DASD). Upon completion of the actual data transfer, the cache or buffer is examined. If less than all of the first allocated segments contain data, then the empty allocated segments are deallocated. Pointers are recorded in a first one of the allocated segments for pointing to additional allocated segments that store data from the same DASD track. In this manner the DASD track is emulated in the cache or buffer.

Co-pending commonly-assigned application for patent Ser. No. 07/441,126, now U.S. Pat. No. 5,097,261 shows a data compaction system for a magnetic tape peripheral data storage system. Tapes do not have any addressable data storage areas. The entire tape is formatted each time it is recorded. This formatting feature in magnetic tapes enables storing variably sized records as variably sized blocks of data. The storage of uncompressed and compressed data is by addressable blocks of such data. The application does show including a plurality of records in one block of data recorded on the tape. Another co-pending commonly-assigned application for patent Ser. No. 07/372,744, filed Jun. 28, 1989, now U.S. Pat. No. 5,200,864 shows a magnetic tape data storage system that automatically stores a plurality of small records in each block of recorded data. Each of the records remain individually addressable. A purpose of combining a plurality of records in one block is to reduce the number of inter-block gaps for increasing the storage capacity of the magnetic tape.

Data compression and decompression algorithms and systems are well known. The MacLean patent, supra, shows an in line (real time) data compression/decompression system for use in high speed data channels. This system uses an algorithm shown in the Langdon, Jr. et al U.S. Pat. No. 4,467,317. Batch processed (software) data compression and decompression is also well known. PKWARE, Inc., 7032 Ardara Avenue, Glendale, Wis. 53209 USA provides the software programs PKZIP for batch compression, PKUNZIP for batch decompression among other compression-decompression software. Another data compression-decompression algorithm has been used for both batch (software processing) and in-line (hardware-integrated semiconductor chips) processing. The known Lempel Ziv-1 data compression/decompression algorithm is used for both in-line (real time) and batch data compression and decompression. It is preferred to use the latter algorithm. Shah and Johnson in the article DATA COMPRESSOR DECOMPRESSOR IC in the "1990 IEEE International Symposium on Circuits and Systems, New Orleans, La. USA (pp 41–43) on May 1–3, 1990 describe an integrated circuit using the known Lempel-Ziv algorithm mentioned above. In practicing the present invention, it is preferred that a compression-decompression algorithm that facilitates both batch and in line operations be used. Of course, only batch or only in line data compression-decompression may be used to successfully practice the present invention.

Images or "non-coded" data have been compressed and decompressed for saving data storage space. Reitsma U.S. Pat. No. 4,622,585 shows one video compression scheme.

SUMMARY OF THE INVENTION

An object of this invention is to provide flexible data compression-decompression controls that enable randomly accessing compressed data through relatively simple accessing mechanisms.

In accordance with the present invention, a data file having a plurality of addressable data blocks is segmented into a plurality of groups of such data blocks. Each group of data blocks is separately compressed and decompressed as one unit of data. Each such group is separately transmitted between a host processor and a data storage unit, communications link, etc as one data transfer unit (DTU). The size of the DTU, in terms of the number of data blocks to be included, is determined empirically based upon the data storage capacity (number of data bytes) storable in sectors of a data storage unit, the number of bytes in each of the data blocks of the data file and other system parameters. The data storage of each group in compressed form in a data storage device is described by the data storage system to the host processor, preferably by a command linked to the host processor command effecting the data storage in compressed form. The host processor establishes a directory describing the storage of each and every group of the data file. If the data file is transferred to another system or host processor in the compressed form, the compressed data file directory accompanies the compressed groups. Retrieving compressed data from a data storage device is by retrieving the group of data blocks having the data block(s) desired to be read. Each compressed group of data blocks is transferrable between host processors and data storage units without decompression. The DTU or group receiving data storage medium may be formatted in the well known fixed-block architecture (FBA), the well known count-key-data (CKD), the well known extended count-key-data (ECKD) or any other format.

The foregoing and other objects, features, and advantages of the invention will be apparent from the following more particular description of preferred embodiments of the invention, as illustrated in the accompanying drawings.

DETAILED DESCRIPTION

Referring now more particularly to the appended drawing, like numerals indicate like parts and structural features in the various figures. A data file having a plurality of data blocks is divided into one or more transfer units of data blocks. Before data storage, each transfer unit of data blocks is subjected to its own data compression cycle to create a group of compressed data blocks. The size of the data transfer unit, in bytes, is selected to facilitate addressing and retrieving individual recorded groups of compressed data blocks while providing good channel utilization and compression efficiency. Also the data transfer unit size is selected in part based upon data storage efficiency, i.e. the storage of the data, after compression, should fill several allocated addressable data storage areas. Each of the allocated sectors in each group is filled to capacity except the last sector of a group that may be partially filled. It is desired to reduce the number of partially filled data storage sectors for more efficiently filling the FBA data storage disk with data. This desire is balanced with enabling efficient random access to the compressed data blocks stored on the FBA data storage disk.

Each stored or recorded group of compressed data blocks is accessed from disk 30 as a single data unit irrespective of the number of disk 30 sectors in which the group is recorded. Since each group of compressed data blocks is compressed in a separate data compression operation, all of the data in each such group must be decompressed starting with the beginning, i.e. first compressed bytes, in each group. Therefore, in randomly accessing a compressed desired data block in a given group, all of the compressed data blocks of each stored group are read from disk 30 as a single disk record. The single disk record is decompressed up to the desired or addressed compressed data block. The desired compressed data block is then decompressed for processing. Limiting the size of the groups of compressed data blocks provides for quicker access to any desired compressed data block. This desire is balanced with a desire to maximize utilization of the disk 30 data storage space. An example of managing these two parameters for creating a desired size compressed data blocks (that varies with each application) is described later.

In an alternate arrangement, each data block is separately compressed. A plurality of such separately compressed data blocks are combined into a single disk record. The byte position within the single disk record for each of the separately compressed data blocks is recorded in the single disk record. Such byte position or offset enables addressing each of the compressed data blocks within a group.

To facilitate access to the groups of compressed data blocks, the host processor program maintains a directory that identifies the addressable data storage areas containing the group as well as the data blocks in the respective groups. This identification preferably takes the form of a file directory that is maintained in host processor 11. Such directory is also stored on the volume or data storage disk containing the group(s) of compressed data blocks. Preferably, the directory is transmitted to the disk device as a part of each transfer of a compressed file having plural groups of compressed data blocks. This arrangement establishes on the FBA disk a directory that effects addressability of the compressed data blocks within the respective groups.

Figure 1:
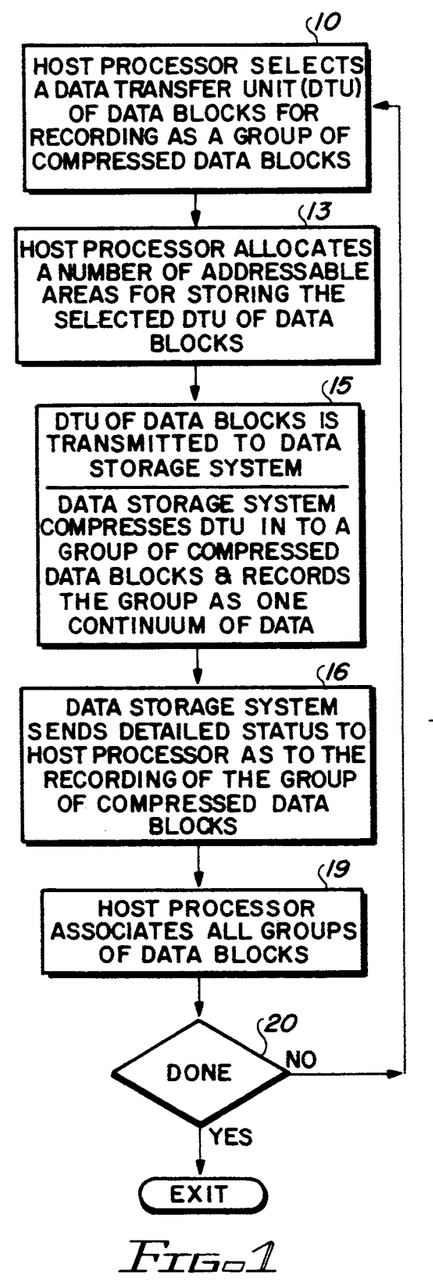
FIG. 1 is a flow chart illustrating data storing operations using the present invention.
Figure 2:
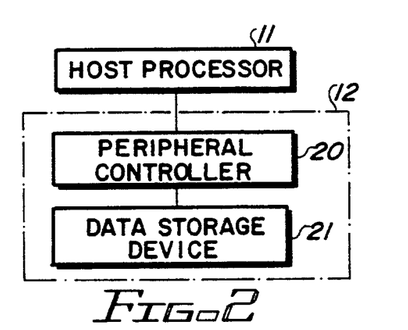
FIG. 2 is a simplified block diagram of a data processing system in which the FIG. 1 illustrated data storing operations may be advantageously employed.

FIG. 1 illustrates recording a data file by grouping a plurality of data blocks of the file into a smaller number of groups of compressed data blocks. Step 10 is executed in a host processor 11 (FIG. 2). A data file, or part of a data file, is identified for compressed data storage. The data file consists of a plurality of data blocks. The term data block includes data records (coded data), sub-file structures, individual images, graphs and the like, drawings and other forms of graphics, combined graphics (non-coded data) and text(coded data), and the like. As later detailed, the data file is divided into desired sizes of compressed data blocks for transfer as a data transfer unit DTU to a storage unit or over a communication link and for maintaining a random access capability to the recorded groups of compressed data blocks. The size of each DTU and resultant recorded group is dependent on diverse variables, as will become apparent. Completion of one execution of step 10 results in one such group of data blocks being selected for compression and storage.

Step 13 is executed by host processor 11 (FIG. 2). The number of uncompressed data bytes in the DTU of data blocks (the product of the number of data blocks times the number of bytes in each data block) is divided by the data storage capacity of one addressable data storage area (sector of an FBA formatted disk) and rounded to a next higher integer if the product includes a fraction. This number represents a maximum number of addressable data storage areas required to store the data; either uncompressed or if a compression does not compress the data into fewer bytes for storage. At this juncture, it is not known how many addressable data storage areas are required to store the group of data blocks after compression. To ensure that the group of data blocks is storable on the data storage medium (optical disk 30 is used in the illustrative embodiment), a number of the addressable data storage areas sufficient to store the entire group of compressed data blocks is initially determined for storing the group of data blocks in an uncompressed form.

Step 15 is executed by both the host processor 11 and data storage system 12. The selected DTU of data blocks is transmitted by the host processor to the data storage system. The data compression of the selected DTU of data blocks is compressed before storage on the data storage medium (not shown) of data storage device 21. There are several methodologies that may be employed herein. The FIG. 1 indicated methodology requires the data storage system to allocate the maximum number of addressable data storage areas. Then the data transfer occurs requiring the data storage system to compress the selected DTU of data blocks just before the data are recorded on the data storage medium (not shown) of data storage device 21. Upon completion of the compression and data storage or recording as one continuum of data, data storage system 12 determines the number of addressable data storage areas actually used to store the compressed group of data blocks. The unused but allocated addressable data storage areas are then deallocated. In the event that certain data blocks compress to a greater number of bytes than the original or uncompressed data, then, as will become apparent, the data compression step is not used. Control data are recorded on the FBA disk that indicates which data are compressed and which data are not compressed. Such control data are used in retrieving data from the data storage (FBA) disk, as will become apparent. As later detailed in this specification, step 16 data storage system 12 sends the storage locations of the just-recorded group of compressed data blocks to the host processor 11 for inclusion in a directory of the data file to which the recorded group of data blocks is a member.

As second methodology has the data compression-decompression performed in host processor 11. As such, host processor 11 includes the data compression mechanism, either software or hardware, and sends the compressed selected group of data blocks to data storage system 12 for storage. In this instance, if batch compression is used, host processor determines the number of addressable data storage areas required for storing the compressed group of data blocks. Host processor 11 then sends the required number of addressable data storage areas to data storage system 12 for allocation just before the compressed data are transmitted to the data storage system.

In a third methodology, the uncompressed group of data blocks are transmitted twice by host processor 11 to data storage system 12. A first transmission enables data storage system 12 to accurately measure the number of addressable data storage areas that will be required to store the compressed data. In the first transmission the data are compressed but not recorded. The number of compressed data bytes are counted to determine the data storage extent (number of sectors or addressable areas) for the compressed data. The data storage system 12 then allocates the indicated number of contiguous sectors for receiving and storing the compressed data. A second transmission of the same data to the data storage system 12 results in the compression and storage of the compressed data in a data storage medium.

In each of the above described methodologies, if the number of bytes in the compressed file is greater than the number of uncompressed data bytes, then the data are recorded in the uncompressed form. Further, when updating a group of compressed data blocks, the number of compressed data bytes may exceed the capacity of the currently allocated sectors. As described later with respect to FIG. 4, a change in allocation of sectors for storing the updating DTU may be required.

Also, in each of the above described methodologies, the data blocks to be compressed and stored from each DTU are preferably compressed and stored as one group. That is, all data blocks in each DTU are compressed during one data compression cycle to produce one group of compressed data blocks. An alternate data compression approach is to individually compress each of the data blocks in each DTU. Then the group of compressed data blocks consists of a plurality of individually compressed data blocks. In the alternative data compression, a header in each group can identify the byte offset within each group of the individually compressed data blocks. Such individually compressed data blocks may also be identified on the data recording disk by illegal recording code characters, such characters are well known for diverse data recording codes.

Host processor 11 in step 19 logically associates all recorded groups of compressed data blocks via a later described file directory. When employing the above described first methodology, upon storing the compressed data, data storage system 12 reports to host processor 11 the actual number of sectors used to store the compressed data and further address and identifying data therefore, as will be described.

Figure 8A:
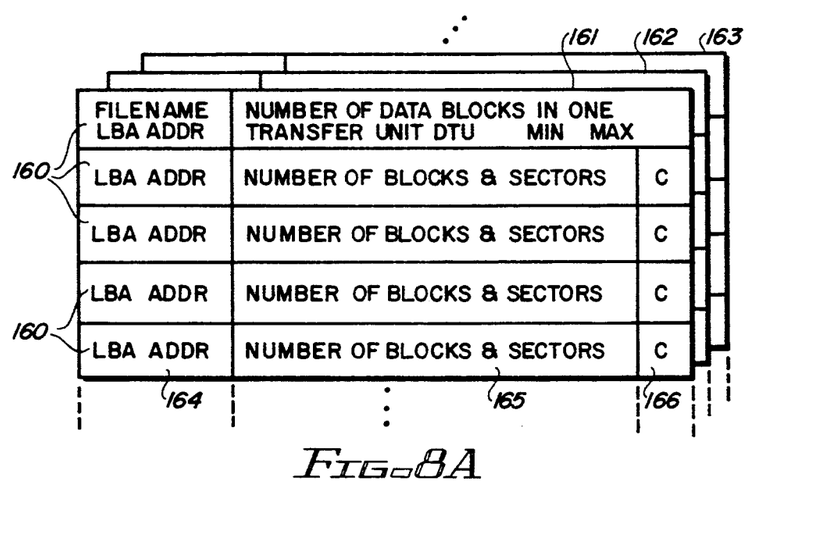
FIG. 8A diagrammatically illustrates a file directory of a plurality of compressed groups of data blocks of a file.

At step 20, host processor 11 determines whether all of the data to be compressed and recorded have been recorded. The details regarding the recorded group of compressed data blocks (see step 19) have been entered into the later described file directory (FIG. 8A). If all of the above described machine operations have been completed, then the operation is "done", enabling exiting to other machine operations beyond the present description. Otherwise, steps 10–19 are repeated as above described until all of the data have been compressed and recorded. It is to be noted that other machine operations may be performed by host processor 11 in a multi-tasking or interrupt driven data processing environment while steps 10–19 are in the process of execution as is known in the data processing art.

FIG. 2 shows a data processing system in simplified form. Host processor 11 attaches a data storage system 12. Data storage system 12 includes a peripheral control 20 that connects host processor 11 to data storage device 21. Device 21, in one embodiment of this invention, is a magneto-optical data storage device that operates with removable magneto-optical data storage media or a single medium (disk). As later used in this specification, the term programmed machine includes host processor 11, peripheral controller 20 and programmed portions of data storage device 21. The compression-decompression mechanisms are preferably in the programmed machine. For in-line compression-decompression, it is preferred that the compression-decompression occur in peripheral controller 20. As later described with respect to FIG. 14, the location of the compression-decompression mechanism can be anywhere in the programmed machine. For batch compression-decompression it is preferred to place the compression-decompression in host processor 11.

Figure 3:
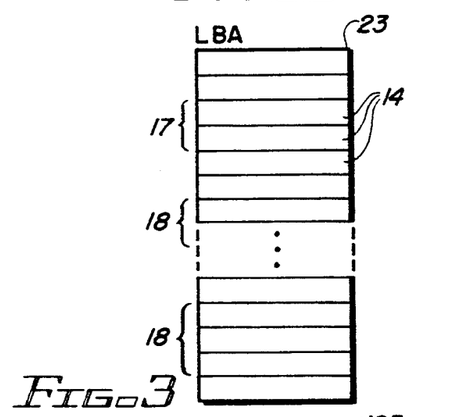
FIG. 3 is a diagrammatic showing of a Logical Block Address (LBA) directory for illustrating identifying recorded compressed groups of data blocks of a data file.

FIG. 3 illustrates a logical block address (LBA) structure 23 used in magneto-optical disk data storage systems for addressing sectors of an optical disk. LBA 23 is a logical to real address translation mechanism that enables full advantage of practicing the present invention. This sector addressing is based upon the logical addressing found in many present day optical disk data storage devices. The attaching host processor 11 addresses data on the data storage medium (not shown) of data storage device 21 using a logical block address included in LBA 23. LBA 23 determines which of the addressable physical data storage addressable areas, such as sectors, are addressed by the respective LBA address. In an alternate addressing arrangement, host processor 11 requests access to a named file. This alternate addressing arrangement includes host processor 11 identifying byte location within the file to begin a data operation and a number of bytes (byte length) to be subjected to the data operation, i.e. read from the disk, for example.

LBA 23 is managed by either one of two algorithms. A first one has been used for optical disks. In this algorithm, the number of entries in LBA 23 is constant for each disk and is based upon the number of addressable entities in the disk designated for storing data. Spare addressable data storage areas or sectors are not included in the LBA 23 logical address sequence, as is known. Known secondary pointers enable addressing spare sectors via LBA 23.

A second algorithm for addressing using LBA 23 is used in magnetic flexible diskettes. In this second algorithm, the address range of LBA 23 varies with the number of demarked or unusable sectors. LBA 23 identifies for addressing only the tracks and sectors that are designated for storing data. In the event one of the sectors identifiable by the illustrated address translation becomes unusable, then the unusable or defective sector is skipped and replaced by another sector. Such substitution is well known.

All of the addressable tracks and sectors on disk 30 are addressed via LBA 23. Such addressing is a table look up matching the host processor 11 supplied logical address to a physical disk track and sector storing the data identified by the supplied logical address. Each LBA logical address has one entry 14 in LBA 23.

Numerals 17 and 18 indicate groups of compressed data blocks recorded on disk 30 using the present invention. Numeral 17 indicates the first group of compressed data blocks of one file. Numeral 18 indicates subsequently recorded groups of compressed data blocks from the same file. The enumeration of the data blocks in the recorded groups 17–18 is maintained in its original sequence as generated by host processor 11. As will become apparent, the compressed data blocks in the respective groups are identified in a file directory shown in FIG. 8A.

Figure 5:
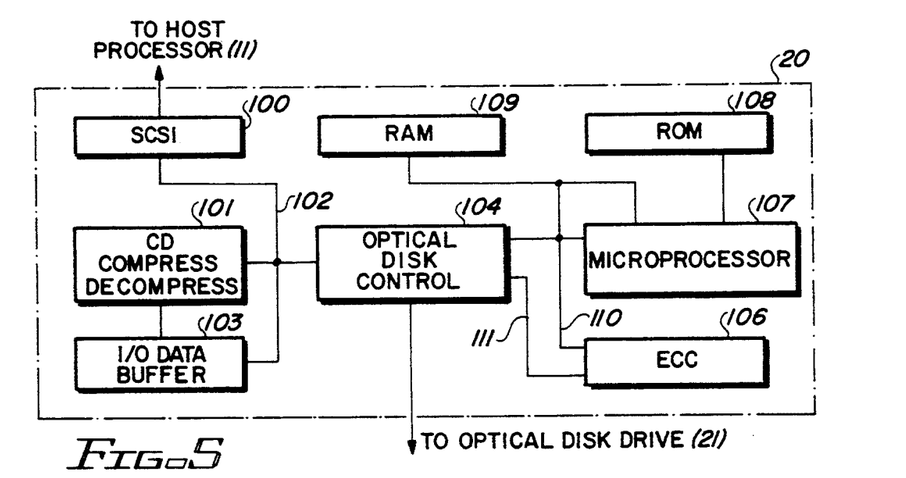
FIG. 5 is a block diagram of a peripheral controller usable in the FIGS. 2 and 4 illustrated data processing systems.

FIG. 5 illustrates a peripheral controller 20 used in an early embodiment of this invention. Such peripheral controller 20 is interposed between host processor 11 (FIG. 2) and data storage device 21. Data storage device 21 may be the optical disk device shown in the Belser et al US patent, supra. Controller 20 includes the compression-decompression mechanism for in-line or real time data compression-decompression. A connection between host processor 11 and peripheral controller 20 is effected by a SCSI module 100 that implements the known small computer system interface. An IO data buffer 103(dynamically allocated into input data buffers and output data buffers using known techniques) temporarily stores data received from or to be transmitted to the host processor 11. An Optical Disk Controller (ODC) 104 manages the reading and writing of the data to a suitable optical recording disk (not shown) in data storage device 21. Error Correction Control (ECC) module 106 detects and corrects errors in data being read and generates ECC error detection and correction redundancy characters to be written to the medium with the data. Run Length Limited (RLL) (mod-demod) encoding and decoding is performed in data storage device 21 in a usual manner. Such mod-demod encodes and decodes recorded data patterns, such as used in the known 1-7 d-k code. Microprocessor 107 (plus control store 108 and dynamic store 109) controls the various elements of the controller 20. A Compression/Decompression (CD) module 101, such as an integrated circuit referred to by Shah et al, supra, implements the compression algorithms. CD module 101 includes automatic circuit timing and control, as is known, to control data flow through peripheral controller 20 under supervision of microprocessor 107. This compression-decompression is in real time (in-line) with the data transfer. Busses 102, 110 and 111 interconnect the modules, as shown. Controller 20 is preferably packaged with data storage device 21 on a common frame.

Figure 6:
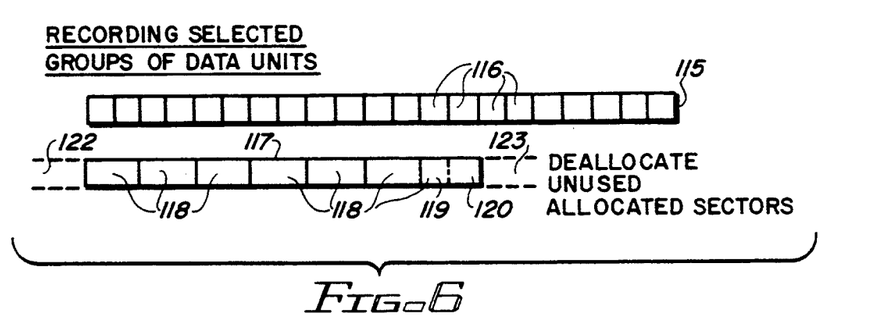
FIG. 6 diagrammatically illustrates storing a compressed group of data blocks as shown in FIG. 1.

FIG. 6 illustrates compression of several data blocks into one group of compressed data blocks recorded in a number of data storing sectors 118 of track 117 of disk 30. A group 115 of a plurality of data blocks 116 is selected for recording as described with respect to FIG. 1. Group 115 of compressed data blocks is transmitted to controller 20 by host processor 11. CD 101 in controller 20 compresses group 115 sufficiently to be recorded as a group of compressed data blocks in sectors 118 plus about one-half of sector 119. The remaining half of last sector 119 is filled with padding bytes, as is known. Numeral 122 indicates a sector that was allocated previously. Numeral 123 indicates a next sector(s) that were initially allocated according to the above-described first methodology. The linked response of controller 20 to the write-compress command indicates to host processor 11 that sector(s) 123 are to be deallocated as such sectors did not receive any of the data from group 115. Host processor 11 responds to controller 20 to deallocate sectors 123.

The above description assumes that host processor 11 is performing data space management. This arrangement is usual. It is to be pointed out that in a multi-host arrangement of sharing device 21 that one of the hosts may be designated to perform space management. Also, in some systems the peripheral controller performs data storage space management.

Figure 7:
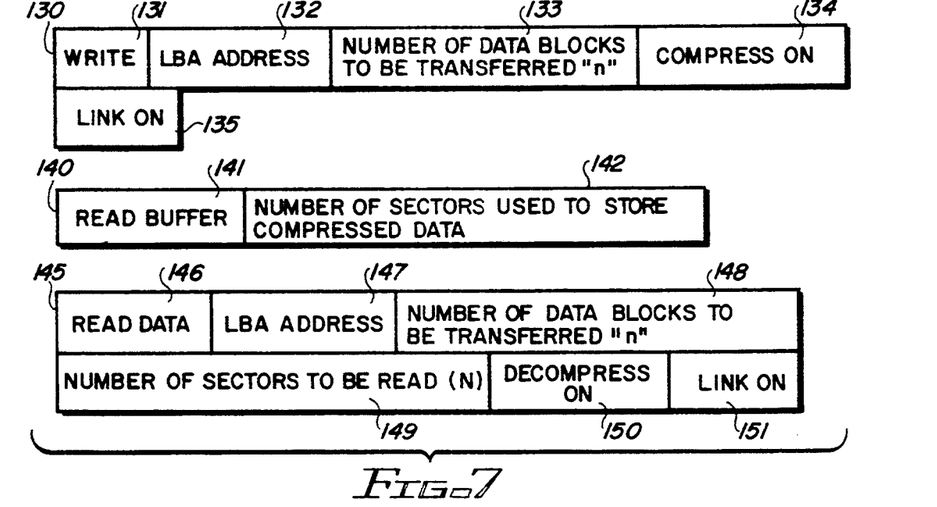
FIG. 7 diagrammatically illustrates host processor commands using a SCSI connection to a data storage system as shown in FIGS. 2 and 4.

FIG. 7 illustrates in abbreviated form three commands for use in a known SCSI interface. WRITE command 130 includes the operation code field 131 that indicates the command is a WRITE command. LBA address field 132 indicates the first LBA address that data being transmitted in accordance with the instant WRITE command is to begin (the lowest LBA address of possibly several LBA addresses required to be used in storing data into a plurality of disk 30 sectors). Field 133 indicates the number of units of data that are to be transferred from host processor 11 to device 21 for storage on disk 30. One unit is that data storable in one sector of the disk 30. FBA disks may have different data storing capacity sectors, such as 512, 1024 (1 kb), 2048, or 4096 bytes of data. Field 134 indicates whether or not the data to be transmitted is to be compressed. Field 135 indicates that this WRITE command is linked to read buffer command 140. This command linkage requires peripheral controller 20 to report to host processor 11 the details of the data storage, i.e. number of sectors actually used, the data that enables host processor 11 to build an entry for the later described FIG. 8A illustrated file directory, and identifies the sectors to be deallocated. It is noted that LBA 23 is updated in host processor 11 with a copy thereof recorded in a sector of disk 30. Also, a copy of the FIG. 8A illustrated file directory is recorded on disk 30, preferably in a uncompressed form at a first LBA 23 logical address that immediately precedes the first LBA address for storing compressed data.

Read buffer SCSI command 140 includes operation code field 141 that indicates the command-is a READ BUFFER command. Controller 20 responds to receipt of a READ BUFFER command to transfer data from an output register(s) of IO buffer 103. Controller 20 stores the information relating to storing a group of compressed data blocks in such output buffer 103 register(s) in preparation to respond to the READ BUFFER command linked to the WRITE command 130. Field 142 indicates to controller 20 the number of sectors used to store the compressed data blocks. That is, host processor 11 knows the number of disk sectors required for storing the compressed data blocks, hence the new entry for the FIG. 8A illustrated file directory.

READ DATA command 145 has operation code field 146 having an indication that the command is a READ DATA command. The first LBA address to be used for transferring data from disk 30 to host processor 11 is indicated in field 147. Field 148 indicates the number (n) of data blocks requested or commanded to be transferred from the FBA disk to the host processor 11. Field 149 indicates to controller 20 the number (N) of disk sectors that are to be read. Field 150 indicates that decompress is either on or off. Link on bit 151 is usually reset to be inactive. For reading one group of compressed data blocks, controller 20 reads the indicated number (N) of sectors, decompresses the data blocks, then transfers the decompressed data blocks to host processor 11. Controller 20 counts the number of data blocks transferred such that when the indicated number n of field 148 is reached, the data transfer is terminated. The data block counting is also used as an integrity check.

The FIG. 8A illustrated file directory can indicate different levels of detail, the selected level is application dependent. Every file that has data blocks recorded in groups of compressed data blocks has a separate portion of the directory respectively indicate by numerals 161, 162 and 163 for three different data files. Each row 160 of each directory represents one entry. A first entry in each directory include in column 164 the filename of the file and the LBA address at which the directory is recorded on disk 30. Column 165 in the first or top most entry indicates the number of data blocks in each data transfer unit. The term data transfer unit (DTU) indicates that a given number of data blocks are to be transferred between disk 30 and host processor 11 during each data transfer. The remaining entries 160 are respectively for the transmitted and recorded groups of compressed data blocks. Again, column 164 in the respective entries indicates the first LBA address used to store the group. Column 165 indicates the number of data blocks recorded and the number of sectors used to store the respective groups of compressed data blocks on disk 30. Once all of the data blocks are compressed in a single data compress operation, the group of compressed data blocks are a continuum of data with no external indication of the data block boundaries. The decompression mechanism and associated controls identify the data block boundaries after decompression, as is known.

In addition to the information contained in the FIG. 8A illustrated file directory, additional details of each group may be provided. In such an alternate implementation of the file directory, controller 20 returns, in addition, for each group of compressed data blocks (i.e. for each respective entry of the FIG. 8A illustrated file directory) a map of the relation of data blocks and data storing sectors (uses the LBA logical address, not the actual physical location on disk 30) for each of the groups. This additional information is used by the host to manage the recorded data and unused disk 30 sectors indicated in LBA 23.

All entries contain the above indicated mapping of data blocks to LBA addresses for each and every group (Gp.) of compressed data blocks in the current file. That is, each data block is indicated as being recorded in one or more sectors, depending on the compression and size of the data blocks. Several compressed data blocks may be recorded in one sector. In this instance, the LBA addresses are the same for starting and ending, i.e. $LBA_{10}$ to $LBA_{10}$ for example could occur for several data blocks.

A format of the FIG. 8A illustrated directory using the additional addressing information is set forth below.

| First entry | Filename | Number of data blocks in a data transfer unit |
|---|---|---|
| Second entry | Gp. 1 LBA | Number of data blocks and sectors in this group |
| | data block n | LBA N at byte B |
| | data block n + 1 | LBA N at byte $B^2$ |
| | data block n + 2 | LBA $N_2$ at byte $B^3$ |
| (Map of all data blocks in group (Gp.) 1 continues, term "byte" indicates byte displacement of the respective compressed data block as recorded in a sector.) | | |
| Third entry | Gp. 2 LBA | Number of data blocks and sectors |

(Map of data blocks to LBA addresses is set forth above)

The super scripts merely indicate 1st (no super script), second, etc byte positions of the respective blocks n, n+1, n+2 etc.

The above described directory structures enable the data contents of a single group of compressed data blocks to be updated without the necessity of reading and then rewriting the entire file. An update of a group of compressed data block only requires the reading of one group of compressed data blocks. The update group of compressed data blocks may require more sectors for storage than that use to store the previous generation group of compressed data blocks. That is additional sectors have to be allocated. Since it is desired that each group of compressed data blocks are recorded in contiguous sectors (except of unaddressable intervening defective sectors), a new allocation may be required. All of this activity is explained later with respect to FIG. 4. Host processor 11 uses this information to determine the next available set of contiguous LBA addresses that have sufficient number of addresses (sectors) for storing the updated group of compressed data blocks.

For WORM (write once, read many) optical disks, the host processor may issue a MEDIUM SCAN command to locate the next available LBA addressed sector for storing the updated group of compressed data blocks. Host processor 11 saves this information in an expanded directory entry for use when the data are to be retrieved or read.

As later described with respect to FIG. 10, another control parameter is a minimum or maximum number of sectors to be used in the CKD and ECKD examples for practicing the present invention. The number N of sectors required to store the uncompressed data is compared with a MIN (minimum value) and a MAX (maximum value). If the number of required sectors is between the MIN and MAX values, then a DTU is made using the number N. MIN ensures a reasonable usage of disk storage space while MAX ensures a reasonable access to compressed data blocks. If N is greater than MAX, then N is made equal to MAX. If N is less than MIN, then N is made equal to MIN. The number of data bytes in a DTU is N*SB (SB is number of bytes storable in one sector) for FBA devices and N*DB (DB is number of data bytes desired for storing one data block) for CKD and ECKD devices. The number of bytes in a DTU is stored in the first or top entry 160 (FIG. 8A) of each file directory. As one variation, field 166 in each of the entries 160 contains a compress DTU indicating bit C. If C is unity, then the data represented by the respective entry 160 are recorded in a compressed form. If bit C is zero or nil, then the data are recorded on disk 30 without data compression. The compressed bit C may also be recorded in each and every sector storing data in accordance with the present invention.

Figure 8B:
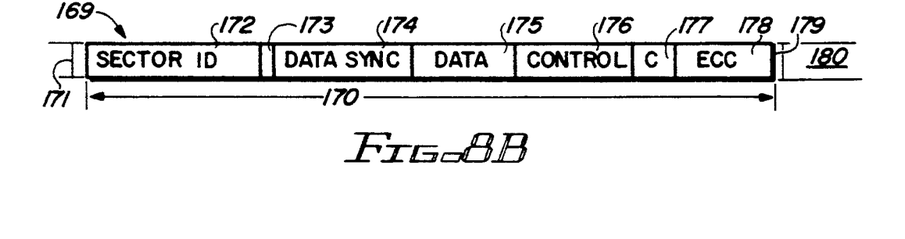
FIG. 8B diagrammatically illustrates format of a disk sector.

FIG. 8B diagrammatically illustrates format of a disk sector of an FBA disk. Sector 170 is in track 169 of disk 30. Intersector gap 171 separates sector 170 from an immediately preceding sector (not shown). Sector ID 172 is an embossed area that contains the track and sector address of sector 170. Intrasector gap 173 separates the hard sectored or embossed mark 172 from the magnetooptically recorded portion that constitutes the remainder of sector 170. Data synchronization signals DATA SYNC 174 are magnetooptically recorded with the data stored in portion 175 of sector 170. Control area 176 stores magnetooptically recorded control signals, as may be desired. A compress bit C 177 (considered a part of the control signals in area 176) if set to unity indicates that the data in portion 175 are compress. If C 177 is set to zero or nil, then the data stored in portion 175 are not compressed. Sector 170 ends with the error detection and correction redundancy in ECC 178 portion. ECC 178 stored signals are generated and stored in a known manner that is not pertinent to an understanding of the present invention. Inter-sector gap 179 separates sector 170 from a next succeeding sector 180. It is preferred that compress bit 177 be used while practicing the present invention.

Figure 4:
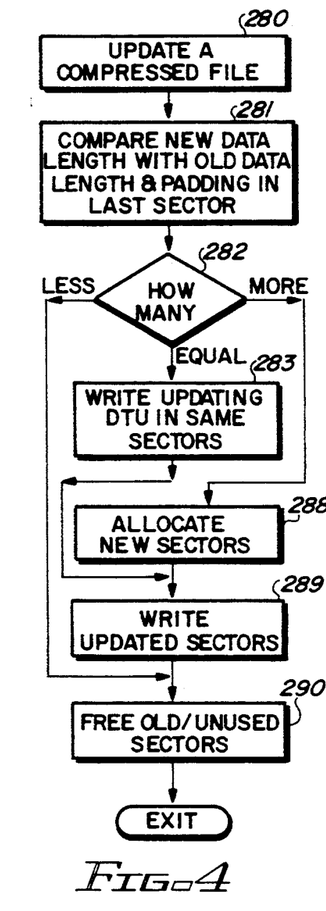
FIG. 4 is a flow chart showing machine operations that update a compressed data file.
Figure 9:
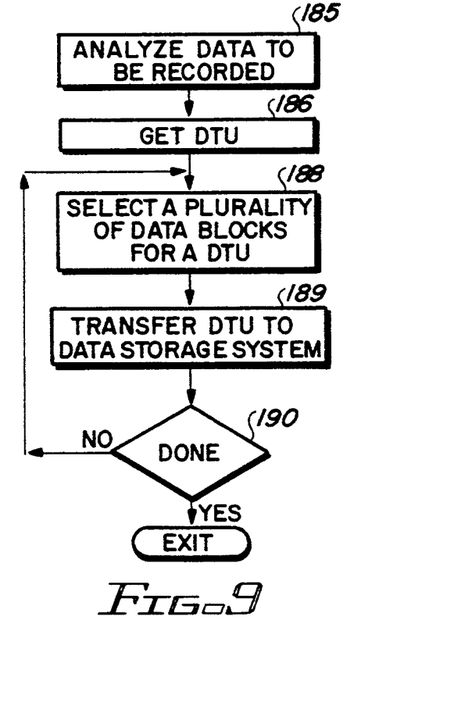
FIGS. 9-13 are flow charts showing details of the operation shown in FIG. 1.

FIG. 9 is a flow chart showing a sequence of machine operations for storing a file in a plurality of groups of compressed data blocks wherein each group is separately transmitted from a host processor to a data storage system as a DTU having a number of uncompressed bytes as set forth above. At step 185 the data to be recorded is analyzed for determining the number of DTU's to be generated. The actual size in bytes/data blocks of a DTU may be different from file to file. In step 186, the DTU size is modified to accommodate the number of data blocks to be initially recorded for equalizing the sizes of a plurality of DTU's to be used. For example, if the number of data blocks to be compressed and recorded is less than two desired DTU's and one half of the number of data blocks results in a number of data bytes greater than MIN, then two DTU's each having one-half of the data blocks are created. This same principle is applied to transferring data blocks having any number of DTU's except for updating a recorded group of compressed data blocks, as will become apparent. If the DTU sizes cannot be equalized, then a last DTU may have a number of bytes less than the MIN (minimum) number of bytes. Upon updating the recorded group of compressed data blocks resulting from a small last DTU, a DTU is generated that adds a number of data blocks to make the size of the DTU, hence group of compressed data blocks, larger to meet the DTU size requirements set forth with respect to FIGS. 9 and 11. FIG. 4 relating to updating a recorded group of compressed data blocks illustrates machine steps for storing an updated DTU that is too large for the current allocated data storage space for a recorded group of compressed data blocks resulting from compressing and storing the updated DTU.

At "GET DTU" step 188 (FIG. 9), a DTU of data blocks is built for data transfer. Step 189 transfers the DTU to data storage system 12. Data storage system 12 compresses and stores the transferred DTU as described earlier. At step 190, host processor 11 ascertains whether another DTU is to be transferred. If not (DONE=1), then host processor 11 exits for performing other work not related to practicing the present invention. Otherwise, steps 188 and 189 are repeated until all DTU's have been transmitted to data storage unit 12.

Figure 10:
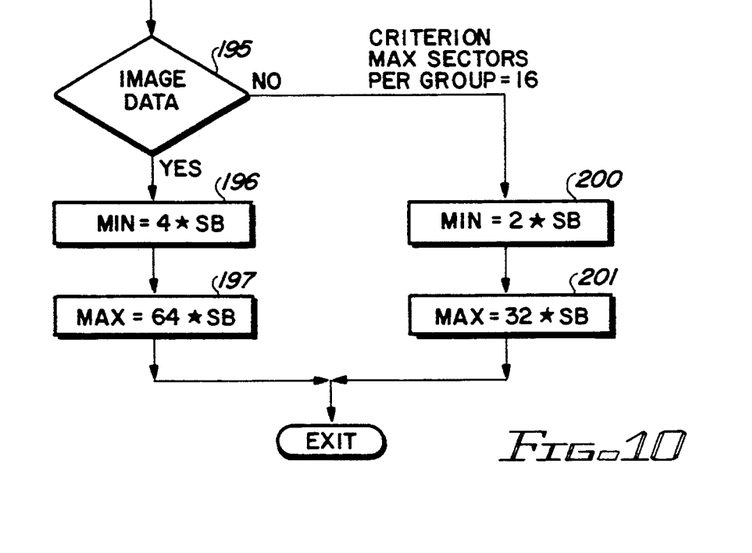

FIG. 10 is a flow chart showing selecting a MIN and a MAX value respectively for image (non-coded or graphics) data and text (coded) data. The compressibility of data is a measure for selecting MIN and MAX. In this regard, each file of image or text data may compress substantially different from data from other files as well as changing from data block to data block in either type of data, image or text. Once a first group of data blocks have been compressed and recorded as a group of compressed data blocks, the compression ratio may be recorded in the FIG. 8A illustrated file directory as a reference for subsequent compression and storage of data blocks. The FIG. 10 illustration assumes that the image data has been compressed 75% (compressed image data blocks are 25% of original size) and text data blocks have been compressed about 50%. These measured values may be changed for calculation purposes for adding a margin of error accommodation into the calculations.

Step 195 determines whether the data in the file is text or image. If image, step 196 calculates the MIN value as 4*SB (bytes in a sector), i.e. at least four sectors are to be used for storing a group of compressed data blocks. The number four is selected in an arbitrary manner. Sector size affects the minimum number of sectors to be used. Step 197 calculates MAX as being 64*SB. In a FBA disk having 1024 byte sectors, then the maximum DTU size is 64 KB (Kilobytes). Again, system considerations may change these values. Such considerations are beyond the present description. From step 195, for text data (IMAGE DATA=NO), step 200 calculates MIN as 2*SB while step 201 calculates MAX as 32*SB. The number of uncompressed bytes for image data in MIN and MAX is equal to the number of uncompressed bytes for text data. The different compression ratios change MIN and MAX values inversely to the expected compression ratio. Upon completing either calculation, host processor 11 stores the MIN and MAX values in the first entry 160 (FIG. 8A) of the appropriate file directory and then exits the calculation.

The MIN and MAX values may also be predetermined and included as parameter data defining a class of data as set forth in Gelb et al U.S. Pat. No. 5,018,060 titled "ALLOCATING DATA STORAGE SPACE OF PERIPHERAL DATA STORAGE DEVICES USING IMPLIED ALLOCATION BASED ON USER PARAMETERS". Gelb et al teach that data set parameters implicitly control peripheral data storage operations. Such implicit control based on data base or file parameter data may be applied to practicing the present invention.

Figures 11, 12:
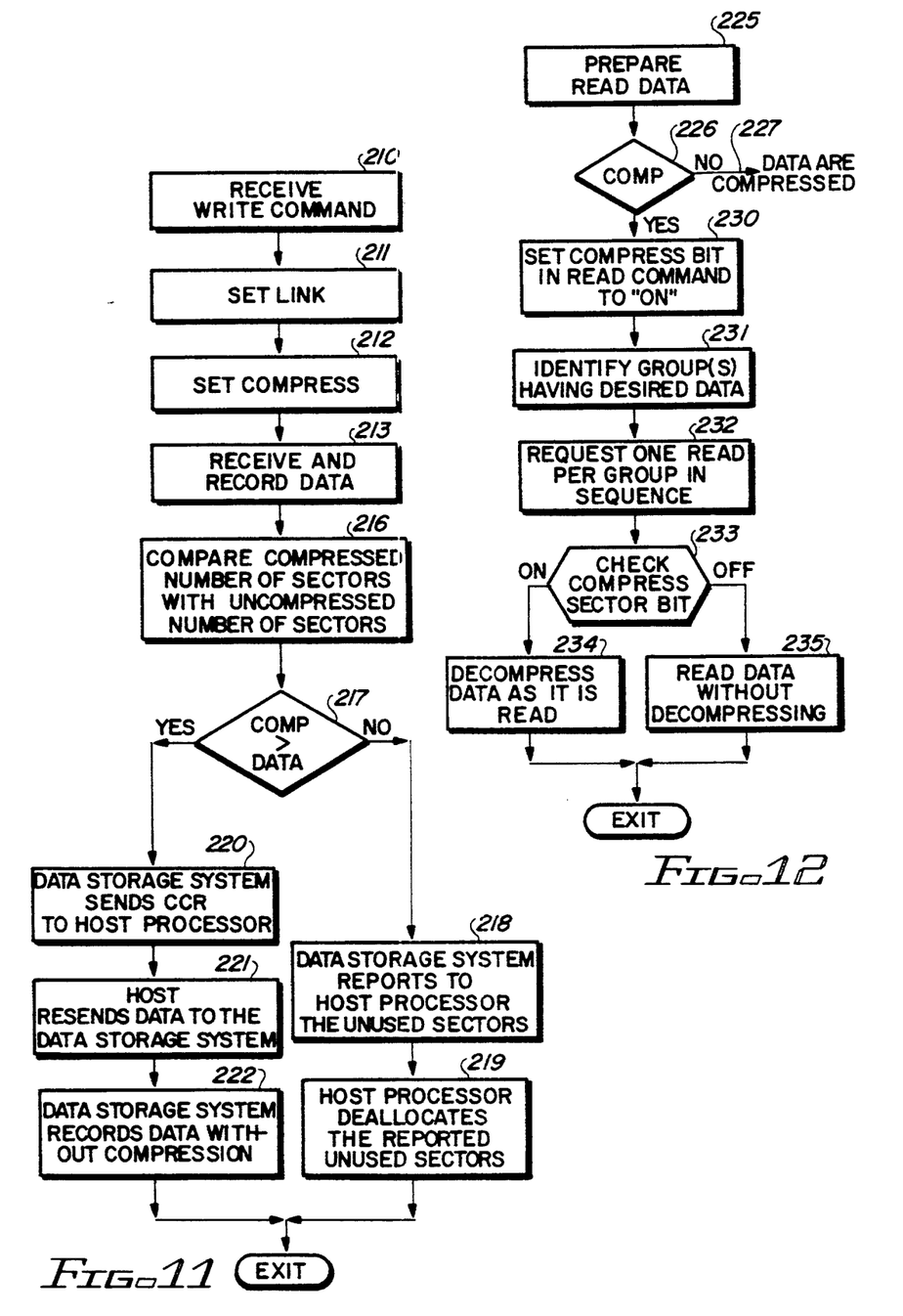

FIG. 11 shows execution of a WRITE command by data storage system 12 wherein the data blocks received in on DTU are compressed then recorded as a group of compressed data blocks. Step 210 receives a WRITE command 130. Step 211 sets the link commanded in field 135 for reporting the actual number of sectors used to store the resultant group of compressed data blocks and a compression ratio CR achieved. Step 212 sets a compress mode in data storage system 12 for activating CD 101 to compress the data blocks being received into one continuum of compressed data. Step 213 receives, compresses and stores the DTU data blocks. Step 216 compares the number of sectors actually used to store the compressed data with the number of sectors initially allocated. Step 217 compares the byte count of the original data blocks in the received DTU with the byte count of the compressed data blocks. In most instances, the byte count of the compressed data blocks will be less than the byte count of the original DTU data blocks. In this instance, at step 218, data storage system 12 indicates to host processor 11 that the data storage operation has been completed. The identification of any unused sectors plus other information describing the just-completed data recording operation is to be transferred from data storage system 12 to host processor 11. This transfer is effected by host processor 11 responding to the indication of a completed recording operation by issuing a READ BUFFER command 140 to data storage system 12 to send the number of unused allocated sectors and all other compression information to host processor 11. Host processor 12 in step 219 responds to the indication of unused allocated sectors to deallocate such sectors for use in storing other data. Note that if the compress bit 134 is off, then no compression occurs.

If at step 217, it is determined that the data compression resulted more data bytes in the compressed data blocks than were in the original data blocks, then the data blocks will be recorded without data compression. This growth in size of the compressed data blocks may occur when the original data blocks have certain data patterns. In any event, at step 220, data storage system 12 sends a channel command retry (CCR) or its equivalent to host processor 11. CCR indicates that the DTU has to be retransmitted by host processor 11 to data storage system 12. That is, the increased in size of the DTU after compression is considered an error condition. The CCR indicates that a recording error has occurred. Host processor 11 responds to the CCR at step 221 by resending the DTU to data storage system 11. At step 222, data storage system 12 stores the DTU without data compression. The above-described operations are exited from either step 219 or 222.

FIG. 12 is a flow chart showing system operations for reading data. Host processor 11 in step 225 prepares to read data, i.,e. identifies the data blocks to be read. Host processor 11 then in step 226 searches for a file directory (FIG. 8A). Such file directory may be read from disk 30. If there is no file directory relating to compression, then the data are not compressed. Also, if the field 166 of the FIG. 8 illustrated directory for the identified group is zero, then that group is not compressed. Further, if data to be read are compressed and it is desired to decompress in a unit other the storing data storage system 12, step 226 directs host processor operations to read all identified data without decompression via path 227. From path 227, a usual data recording operation not involving data compression is performed (not shown). Host processor 11 builds issues one READ command 145 for each of the recorded groups of compressed data blocks to be read. Depending on the desired read operation, field 150 or READ command will be set to indicate either decompress or no decompress OFF. Host processor 11 before sending the READ command 145 to data storage system 12 examines field 150 at step 226. If host processor 11 at step 226 finds that the data to be read are compressed and decompression is desired, then step 230 sets field 150 to compress ON. All of the groups of compressed data blocks having data blocks to be read are identified in step 231 via examination of the appropriate file directory 161-163. Host processor 11 in step 232 then builds one or more READ commands 145 for reading the step 231 identified groups of compressed data blocks with decompression. The term build used above indicates that the appropriate control data are inserted into a READ command for commanding data storage system 12 to perform a desired read. Such command includes the number of LBA addressed sectors to be read as well as the logical address in LBA of a first one of the sectors. One READ command is sent by host processor 11 to data storage system 12 in step 232, there can be a number of READ commands sent for fetching a plurality of groups of record blocks. Data storage system 12 receives the READ command. At step 233, data storage system checks the sector compress bit of the first sector storing the requested group to be read. If bit C 177 (FIG. 8B) is unity, then the data are compressed. Data storage system 12 then in step 234 reads the requested group including decompressing the data. It is to be noted, that if the READ command field 150 indicates decompression is OFF, then no decompression occurs even if bit C 177 is set to unity. On the other hand, if bit C 177 equals zero (data in the sector are not compressed), the at step 235 data storage system 12 reads and sends the read data without decompression to host processor 11. The FIG. 2 illustrated system exits the read operation for one group from either step 234 or 235.

Figure 13:
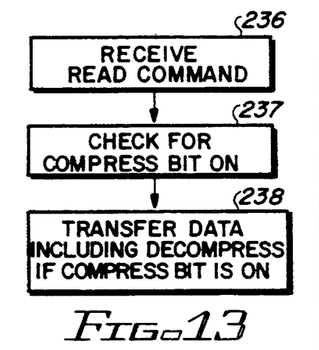

FIG. 13 illustrates operation of data storage system responding to a READ command 145. Step 236 receives the READ command. Step 237 checks the compress field 150. If the compress field indicates that decompress is ON, then C bit 177 of the sector being accessed is checked to ensure that the data to be read is in fact recorded and stored in a compressed form. Step 238 executes the READ command by decompressing the data being read if field 150 indicates compression and C bit 177 is ON. If the field 150 indicates decompression if OFF, the data stored in the addressed sectors are transferred without decompression whether compressed or not. That is, in all cases, data storage system 12 transfers the data without decompression if field 150 indicates compress is OFF. This control enables transferring data in either compressed or decompressed form.

Figure 14:
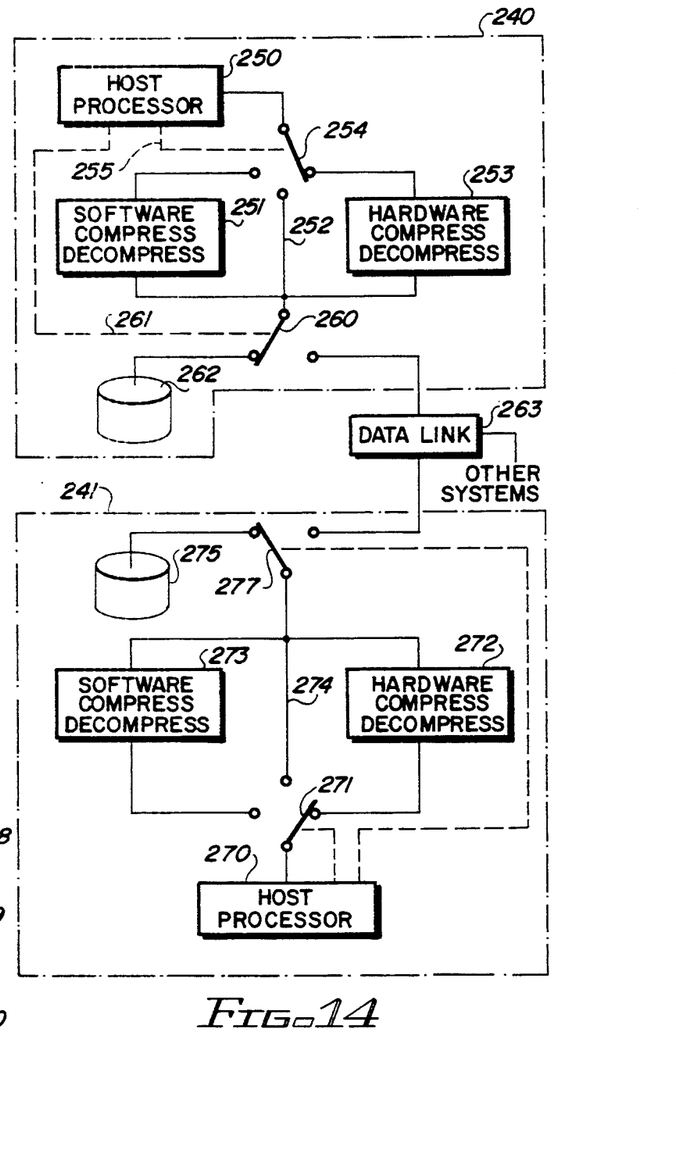
FIG. 14 is a logic diagram illustrating applying the present invention to a multi-unit data processing system that has a plurality of data storage devices and host processor interconnected as by a data link or local area network.

FIG. 14 illustrates one application of the invention in a system having linked host processors. Both batch and in line data compression/decompression are employed. Compression-decompression software modules 251 and 273 provide batch data compression and decompression while integrated circuit chips (hardware compress decompress) 253 and 272 provide in line (real time) data compression-decompression Two data processing systems 240 and 241 are linked by data link 263. Link 263 may be a local area network (LAN), a data communication circuit or transfer of a removable data cartridge manually or via a library, mail etc between the two data processing systems. Host processor 250 in system 240 has a software compress-decompress facility 251, a transfer link facility 252 that involves no compression or decompression and an in-line hardware compress-decompress facility 253. Facilities 251-253 may be physically located in data processing system 240 in host processor 250 or as a part of a channel connection that includes logic switch 254 (programmed or hardware) connecting host processor 250 to facilities 251-253. Dashed line 255 indicates that switch 254 is programmingly controlled by host processor 250. A given data processing system may have only 1) batch compress facility 251 and link facility 252, 2) in-line facility 253 and link facility 252, 3) all facilities 251-253 or 4) either facility 251 or 253 may be located either in data storage system 262 or data link 263.

The input-output (IO) connections from facilities 251–253 are effected by logic switch 260 that is programmingly controlled by host processor 250 as indicated by dashed line 261. Switch 260 directs IO data flow between facilities 251–253 and a data storage system 262 or data line 263.

Data processing system 241 is shown as being identical to data processing system 240. Data processing system 241 includes host processor 270 that may have a different computational arrangement and capability from host processor 250, logic switch 271, facilities 272–274, data storage system 275 and switch 277 that selectively connects data processing system 241 to data link 263 to other systems and data processing system 240.

FIG. 4 illustrates updating a recorded group of compressed data blocks. Host processor 11 in step 280 has updated data blocks and desires to update a file recorded in data storage system 12 as a plurality of groups of compressed data blocks. Step 281 compares the data length (number of uncompressed data bytes) of the updating DTU with the number of bytes in sectors currently recorded as one group to be updated. Host processor 11 also examines the number of padding bytes in a last sector storing compressed data for estimating whether or not the updated data blocks are storable in the currently allocated sectors for the group(s) to be updated.

At step 282 host processor 11 determines whether or not the updating DTU can be stored in currently allocated sectors or if more or different sectors should be allocated. That is, if the updating DTU has more data bytes than the currently recorded group, then additional sectors are allocated at step 288 (host processor 11 does the allocation). Such new sectors are preferably contiguous sectors that may not include any sectors containing the recorded group of data blocks to be updated. Following allocation step 288, the updating DTU is recorded at step 289. Then, host processor 11 at step 290 deallocates the sectors containing the group of data blocks to be updated. The FIG. 2 illustrated system then exits the updating operation from step 290.

If, at step 282, the number of data bytes in the updating DTU is substantially equal to the number of bytes (uncompressed) of the recorded DTU, then the updating occurs at step 283 using the sectors currently storing the group to be updated. The FIG. 2 illustrated system then performs step 290 before exiting the updating operation. If the updating DTU has fewer bytes than the recorded group, then the updating DTU is recorded in sectors selected from the sectors containing the group to be updated. The sectors not used to record the updating DTU are deallocated at step 290.

It may be decided that, independently of any data growth patterns, to always store the updated data blocks in a newly allocated set of sectors and to deallocate or free the sectors storing the current group(s) of compressed data blocks to be updated. In this situation, steps 288–290 are performed. For example, if there is a desire to save the original group(s) of compressed data blocks, such original recording may be retained. Host processor 11 then updates the appropriate file directory 160–162 and exits the storage operation.

In the updating operation shown in FIG. 4, whenever the compressed data has more bytes than the original uncompressed data, the data are recorded in an uncompressed form. The steps shown in FIG. 11 are added to the FIG. 4 illustrated sequence.

While the invention has been particularly shown and described with reference to preferred embodiments thereof, it will be understood by those skilled in the art that various changes in form and details may be made therein without departing from the spirit and scope of the invention.

What is claimed is:

1. In apparatus for storing data in compressed form in a data storage device having a multiplicity of addressable data storage areas, each of the data storage areas for recording a first predetermined number of data bytes, the data storage device being connected to a programmed machine, said programmed machine for receiving data to be recorded, said received data being arranged in a plurality of addressable data blocks, the improvement including, in combination:

selection means in the programmed machine for selecting a plurality of data transfer units of said data blocks to be recorded, each said data transfer unit of data blocks having a given number of data bytes not less than said first predetermined number and includes one or more of said addressable data blocks;

allocation means in the programmed machine connected to the selection means for responding to said given number to indicate that said data transfer units of data blocks each requires a first number of said addressable data storage areas for storage in the data storage unit and for indicating that all of said first number of said indicated addressable data storage areas are allocated for storing data from respective ones of said selected data transfer units;

compression means in the programmed machine connected to the selection means for receiving and compressing said data transfer units of data blocks into respective compressed blocks to be respectively recorded in a second number of said first number of addressable data storage areas, said second number being equal to or less than said first number;

data access means in said data storage device and being connected to said compression means for respectively receiving and then respectively recording said compressed blocks in said second predetermined ones of said first number of said addressable data storage areas and indicating that the respective compressed block is recorded in the respective ones of said second predetermined ones of said first number of said addressable data storage areas; and directory means in the programmed machine and connected to said data access means and to said allocation means for receiving said indications of said allocation and said indications of said second ones of said first number of said addressable data storage areas for indicating that said compressed blocks are recorded in said respective second predetermined ones of said first number of said addressable data storage areas and that said recorded compressed blocks contain respective ones of said selected data transfer units of data blocks and that a plurality of said data transfer units of data blocks have been separately compressed and recorded in respective ones of said compressed blocks.

2. In the apparatus set forth in claim 1 further including, in combination:

range means in said programmed machine indicating a range of number of bytes to be used for transferring said said data transfer units between said programmed machine and said data storage device; and said selection means being connected to said range means for receiving said range indication and responding to the received range indication for selecting said given number of said data blocks to be within said indicated range of data bytes such that each of said data transfer units has a number of bytes of data within said indicated range of number of bytes.

3. In the apparatus set forth in claim 1 further including, in combination:

CKD means for supplying a plurality of CKD data blocks;

said data storage device having a CKD formatted disk for receiving and recording CKD data;

said selection means being connected to said CKD means for receiving and selecting a predetermined number of said CKD data blocks for creating said data transfer units of data blocks;

said data access means having CKD recording means for receiving and recording each of said compressed blocks as a single record on said CKD formatted disk; and repeat means connected to said selection means and to said CKD means for repeatedly actuating the CKD means to supply said data transfer units of data blocks for compression and recording in said respective CKD records.

4. In the apparatus set forth in claim 1 further including, in combination:

said programmed machine including a host processor connected to a peripheral controller, said data storage device being connected to said peripheral controller;

an FBA sectored disk in said data storage device, said FBA sectored disk having a plurality of addressable sectors, each said sector being one of said addressable data storage areas; and said selection means having FBA means for selecting said data blocks for creating said data transfer units to be recorded in a predetermined number of said sectors on said FBA sectored disk; and repeat means connected to said selection means and said compression means for repeatedly actuating the selection means and said compression means for respectively creating a plurality of said data transfer units of data blocks from said data blocks for compression and compressing each of said created data transfer units of data blocks as a compressed block for recording said compressed blocks on said FBA sectored disk such that said file of data blocks is recorded in compressed form on said FBA sectored disk in a plurality of said compressed blocks.

5. In the apparatus set forth in claim 1 further including, in combination:

an FBA formatted disk in said data storage device, said FBA formatted disk having a plurality of addressable sectors for receiving and recording data, each of said sectors having a predetermined data storage capacity indicated by a predetermined number of data bytes; and said selection means being connected to the FBA formatted disk for responding to said sector data storing capacity for selecting said given number of bytes of data to be said predetermined number of bytes in each of said sectors.

6. In the apparatus set forth in claim 1 further including, in combination:

data recording management means connected to said directory means and to said data access means for actuating the directory means to establish a plurality of said file directories, one file directory for each said compressed block;

said recording management means actuating said directory means to record in each of said file directories a number of said data blocks to be included in each of said data transfer units of data blocks and including recording a maximum number of bytes to be included in any one of said data transfer units; and said selection means being connected to said directory means for reading said maximum number of bytes and said number of data blocks and responding to said read numbers to select said data transfer units.

7. In the apparatus set forth in claim 1 further including, in combination:

update means connected to said selection means and to said allocations means for actuating said selection means to update a predetermined one of said recorded compressed blocks with updated data blocks including receiving updated ones of said data blocks and creating a new data transfer unit of data blocks to include said updated data blocks;

said compression means receiving and compressing said new data transfer unit into a new compression block; and said update means connected to said allocation means for actuating the allocation means to allocate a number of said addressable data storage areas for receiving and recording said new compression block in said data storage device.

8. In the apparatus set forth in claim 1 further including, in combination:

first means in said allocation means for allocating predetermined ones of said addressable data storing areas for receiving and recording each of said compressed blocks; and second means in said allocation means responsive to said first means allocating said predetermined ones of said addressable data storage areas to deallocate second predetermined ones of said addressable data storage areas that recorded respective ones of said compressed blocks having identical identifications as data blocks recorded in said first means allocated predetermined ones of said addressable data storage areas.

9. In a machine-effected method of compressing and recording data blocks onto a data storage medium having a plurality of addressable data storage areas, including machine-executed steps of:

first selecting a plurality of data blocks of a file to be compressed and recorded on the data storage medium;

second selecting a plurality of submultiples of said selected data blocks respectively as a plurality of data transfer units;

estimating a maximum number of said addressable data storage areas to be allocated for storing said selected plurality of data blocks after compression in said data storage medium;

allocating said maximum number of said addressable data storage areas to receive and store said selected plurality of data blocks in a compressed form and indicating the allocation of said addressable data storage areas;

compressing and recording each of said data transfer units as respective compressed blocks including recording each of said compressed blocks as a separately recorded record; and creating and maintaining a separate file directory indicating the address and size of each of said recorded compressed block for enabling random access to each said recorded compressed block such that less than an entirety of said file of data blocks are retrieved from said data storage medium for accessing only predetermined ones of said recorded blocks less than all of said recorded compressed blocks and modifying said indicated allocation to indicate a number of said addressable data storage areas storing said compressed block.

10. In the machine-effected method set forth in claim 9 further including machine-executed steps of:

establishing a data storage space management for said file including establishing said file directory to include indications of a desired size in data bytes of each of said data transfer unfits and establishing one entry in the file directory for each of said recorded compressed blocks.

11. In the machine-effected method set forth in claim 9 further including machine-executed steps of:

before recording one of said compressed blocks, allocating a first number of said addressable data storage areas of the record medium for recording said one compressed blocks; and after recording said one compressed data block, deallocating a second number of said addressable data storage areas that contain a recorded compressed blocks wherein said second number is less than said first number.

12. In the machine-effected method set forth in claim 9 further including machine-executed steps of:

supplying CKD formatted data blocks of one CKD formatted file and selecting said CKD data blocks to be compressed and recorded;

separately compressing a plurality of said data transfer units of said CKD data blocks into respective ones of said compressed blocks; and recording the plurality of compressed blocks as one record on a CKD formatted record member.

13. In the machine-effected method set forth in claim 9 further including machine-executed steps of:

selecting an FBA formatted record medium to be said record medium, selecting said FBA formatted record medium to have a plurality of addressable data-storing sectors, selecting each data-storing sector to be capable of recording a given number of data bytes; and selecting said data transfer units to respectively have a first predetermined number of said data blocks have a number of uncompressed data bytes equal to a data storage capacity, in data bytes, of a second predetermined number of said data-storing sectors.

14. In the machine-effected method set forth in claim 9 further including machine-executed steps of:

setting a range of number of bytes to be included in each of said data transfer units; and selecting a number of said data blocks for inclusion is each of said data transfer units such that said selected number of data bytes for each of said data transfer units is within said range.

* * * * *